United States Patent [19]

Becker

[11] Patent Number: 4,763,721
[45] Date of Patent: Aug. 16, 1988

[54] PROCESS FOR THE COOLING OR HEATING OF A GAS

[75] Inventor: Hans Becker, Munich, Fed. Rep. of Germany

[73] Assignee: Linde Aktiengesellschaft, Wiesbaden, Fed. Rep. of Germany

[21] Appl. No.: 760,866

[22] Filed: Jul. 31, 1985

[30] Foreign Application Priority Data

Jul. 31, 1984 [DE] Fed. Rep. of Germany ....... 3428220

[51] Int. Cl.⁴ .................. B01D 53/18; B01D 53/34; F28D 15/00
[52] U.S. Cl. .................. 165/1; 165/104.31; 165/104.14; 165/909; 55/73; 55/84; 55/267; 261/152
[58] Field of Search ........... 165/104.31, 111, 1, 165/909, 104.14; 55/73, 267, 48, 49, 84; 261/152

[56] References Cited

U.S. PATENT DOCUMENTS

| 3,258,063 | 6/1966 | Buss et al. ............ 261/152 |
| 3,615,079 | 10/1971 | De Lara et al. |
| 4,444,128 | 4/1984 | Monro ................. 55/23 |
| 4,586,940 | 5/1986 | Stubenvoll . |
| 4,589,889 | 5/1986 | Spencer ............... 55/73 |
| 4,598,766 | 7/1986 | Michalab et al. ....... 261/152 |

FOREIGN PATENT DOCUMENTS

| 738867 | 7/1966 | Canada ............... 165/104.31 |
| 2505535 | 8/1976 | Fed. Rep. of Germany ............ 165/104.31 |
| 775600 | 5/1957 | United Kingdom ..... 165/104.31 |

Primary Examiner—Albert W. Davis, Jr.
Attorney, Agent, or Firm—Millen & White

[57] ABSTRACT

In the heat exchange of gases, e.g., flue gas, to cool or heat same, the gas is contacted directly with a heat transfer liquid in a first direct-contact heat exchanger, the gas is then subjected to a temperature dependent process step, e.g., $SO_2$ absorption with a physical solvent, and the resultant process gas is reheated or re-cooled in a second direct-contact heat exchanger using the change in enthalpy that the heat transfer liquid has undergone in the first direct contact heat exchanger.

23 Claims, 1 Drawing Sheet

U.S. Patent
Aug. 16, 1988
4,763,721
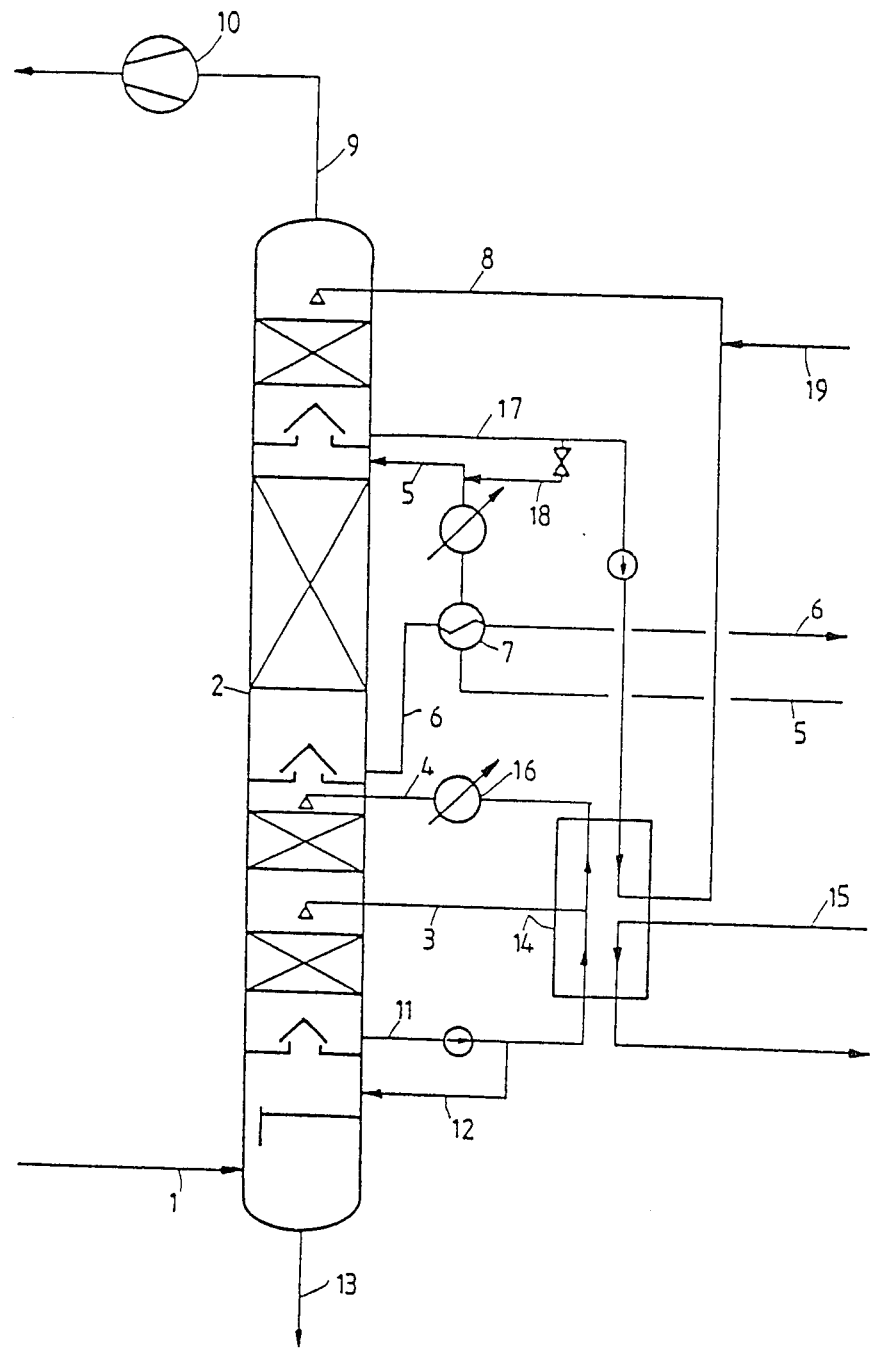

PROCESS FOR THE COOLING OR HEATING OF A GAS

BACKGROUND OF THE INVENTION

This invention relates to a heat exchange process and associated apparatus for the cooling or heating of a gas prior to its treatment in a subsequent process.

In many processes in the chemical industry, for example in gas-cleaning or catalytic processes, it is necessary to precool or heat the gas prior to the actual process. Cooling takes place frequently against cooling water since it is inexpensive, almost always available and, at the same time, acts as an absorbent for impurities, thus effecting a preliminary purification of the gas. The final temperature attainable in this connection, however, is limited by the local cooling water conditions.

For heating a gas, there is employed waste heat obtained, generally through an intermediate heat transfer medium, from the primary process or from another process step. In most cases, however, costly equipment and additional energy charges are involved in the utilization of such waste heat.

SUMMARY OF THE INVENTION

An object of one aspect of this invention, therefore, is to provide an improved system for cooling or heating gases.

Another object is to provide an improved cooling process and apparatus particularly adaptable for the cooling of gases below local cooling water temperatures prior to being treated by some other process such as scrubbing with an organic solvent for the removal of sulfur dioxide.

Upon further study of the specification and appended claims, further objects and advantages of this invention will become apparent to those skilled in the art.

To attain these objects, according to this invention, the gas is cooled or heated by direct contact heat exchange with a heat transfer liquid, the process step is then conducted, and then the gas, after the process, utilizing the change in enthalpy of the heat transfer liquid is treated in a second direct-contact heat exchanger. The temperature of the resultant gas from the second exchanger can be close to the temperature of the gas before the first direct contact heat exchange. The temperature approach is limited by the necessary temperature differences for heat transfer and in some cases by evaporation or condensation effects.

The invention is particularly advantageous where the gas treated in a primary process must thereafter be discharged or further processed at a temperature close to its initial temperature. Thus, it is now possible and extremely expedient to couple the precooling or preheating of the gas upstream to the process by way of direct-contact heat exchangers with the downstream heating or cooling of the gas. Thereby, the cold or heat content of the gas can be economically transferred to a heat transfer liquid and can be re-transferred, at least in part, to the treated gas prior to discharge.

Irrespective of any advantage obtained by increasing the temperature change of the gas by the second direct contact heat exchange step, it is clear that the heat exchange (enthalpy transfer) from the gas to the liquid and in turn to the gas by direct contact is highly favorable both from the equipment standpoint and the rate of heat transfer. Furthermore, direct contact heat exchange can be coupled with simultaneous gas cleaning or absorption, depending on the particulars of the system involved.

According to this invention, two sub-generic aspects are provided for operating the driect-contact heat exchangers. One sub-generic aspect resides in recirculating the heat transfer liquid proper between the first and second direct-contact heat exchangers, preferably by means of a pump. This manner of operation is especially suitable where the product purity of the treated gas permits this technique. The other sub-generic aspect resides in circulating separate heat transfer liquids through the first and second direct-contact heat exchangers and by coupling the two heat transfer liquid cycles with each other by way of an indirect heat exchanger. Coupling of the two heat transfer liquid cycles by indirect heat exchange has a substantial advantage over circulating the same liquid through the two direct heat exchangers insofar as any impurities that may be contained in the first heat transfer liquid cannot pass into the second cycle and this into the gas to be discharged.

The direct contact heat exchange of gas with heat transfer liquid is conducted advantageously in a column, using countercurrent flow. In this connection, packed columns proved to be expecially advantageous. By the use of conventional packing, heat transfer can be conducted with low pressure loss. Examples of such conventional packing include, but are not limited to dumped fillings (columns filled with saddles or slotted rings) or structured tower packings. Such packings exhibit a large internal surface and therefore provide good heat transfer characteristics combined with low pressure drop.

In an especially advantageous embodiment of the process of this invention, water or a high boiling liquid hydrocarbon is utilized as the heat transfer liquid. Since the gas is frequently nearly, if not completely, saturated with water, the latter can be condensed out by cooling and circulating as the first cycle. Oils, which have a low vapor pressure, are especially utilized as the hydrocarbons.

The process of this invention is applicable to all processes requiring either a preceding cooling step, such as, for example, a physical scrubbing process, or a preceding heating step, such as, for example, a chemical scrubbing process or a chemical process. In other words, the invention is useful for any process desired to be conducted at a preferred temperature range. Thus, the process is particularly beneficial in physical scrubbing operations because the solubility of the gas in the liquid is a function of the temperature of the scrubbing step among other variables. In general, solubility substantially increases with a drop in temperature, and the amount of solvent required, in turn, is inversely proportional to the solubility. Since the process economics are greatly affected by the amount of solvent required, it is advantageous in most cases to perform the scrubbing step at the lowest temperatures possible. With the use of the process of this invention in conjunction with such physical scrubbing processes, it is thus possible to achieve a marked reduction in the amount of solvent required and, concomitantly, an almost proportionate reduction in size of the entire regenerating section, as well as in the required initial in-process inventory of the solvent.

In this connection, it is especially advantageous to employ the process of this invention for flue gas desulfurization which conventionally is conducted at temperatures of between 20° and 60° C. In this case, a further lowering of the flue gas temperature and thus of the scrubbing step temperature results in an increased efficiency of the scrubbing process. Since the purified flue gas must be reheated before being exhausted via the stack, it is possible to attain, with the process of this invention, a particularly advantageous coupling between the cooling step and the heating step.

BRIEF DESCRIPTION OF THE DRAWINGS

The attached FIGURE is a schematic illustration of a preferred embodiment of this invention in an environment involving a physical scrubbing step for the removal of $SO_2$ from flue gas. It is to be understood, however, that other environments can also be utilized, including but not limited to, for example, chemical scrubbing or any other process step.

The example shows a combination of a first cooling step (a conventional water quench) by which the flue gas is cooled to a temperature close to the temperature of the available cooling water with a second cooling step for which the heat exchange process according to this invention is used.

DETAILED DESCRIPTION OF THE DRAWINGS

In conduit 1, 259,900 m³/h of a precooled flue gas at a temperature of 53° C. and under a pressure of 1 bar, has the following composition:
$N_2$ 78 33 vol %
$O_2$ 4.98 vol %
$CO_2$ 9.91 vol %
$SO_2$ 0.11 vol %
$H_2O$ 6.67 vol %
$H_2O$ dew point about 40!C The flue gas is introduced into the lower section of a scrubbing column 2. In this lower section, the gas is cooled countercurrently with water by direct heat exchange in two steps: first, the gas is cooled to 32° C. by 540 t/h of water at 29° C. fed into the column via conduit 3, and second, the gas is further cooled to 11° by 235 t/h of water at 8° C. fed into the column via conduit 4. (Water from both cooling stages is collected together at a plate below said lower section and is mostly recycled; consequently, this water will be called first cycle water.)

The next process step does not relate to the process of the invention, it is just part of the specific embodiment, i.e. the physical scrubbing of the flue gas for desulfurization.

The cold gas is scrubbed countercurrently with 230 t/h of cold (10° C.) solvent introduced into the upper section of the scrubbing stage via conduit 5. The solvent, after having absorbed $SO_2$ in a countercurrent manner is withdrawn from the scrubbing stage via conduit 6 and, after being heated up in a heat exchanger 7 against regenerated solvent, is transferred to a conventional regeneration stage (not shown). The solvent used for scrubbing is conventional, the preferred solvent in this case being tetraethyleneglycol dimethylether.

The thus-treated gas, at a temperature of 10° C., is next brought into direct heat exchange, with second cycle water (246 t/h) from conduit 8, having a temperature of 26° C., thereby cooling said water to 12° C. The resultant treated gas at a temperature of 23° C. is discharged, via conduit 9 and compressor 10, in a quantity of 250,360 m³/h. The purified flue gas has the following composition:
$N_2$ 81.31 vol-%
$O_2$ 5.17 vol-%
$CO_2$ 10.29 vol-%
$SO_2$ 0.01 vol-%
$H_2O$ 3.22 vol-%

Via conduit 11, 775 t/h of first cycle water at 37° C. is withdrawn from below said lower section of column 2. A very minor partial stream of this water is recycled via conduit 12 into the column at a still lower section in order to scrub out any water-scrubable impurities in the entering flue gas, such as, for example, dust, HCN, and HF. The resultant used scrubbing water is removed via conduit 13 as wastewater (11.4 t/h) together with condensate from the flue gas formed due to the cooling action.

The remaining amount of the 37° C. water in conduit 11 is recirculated, namely by way of a heat exchanger 14 wherein it is cooled to 29° C. by means of external cooling water (1,240 t/h) in conduit 15 having a temperature of 26° C., and then further cooled from 29° to 15° C. against cooled (12° C.) second cycle water. The external cooling water is thereby warmed up to 31° C. while the second cycle water is brought to a temperature of 26° C. For further cooling, the second partial stream of the first cycle water in conduit 4 is conducted through a cooler 16 and cooled to 8° C. by external refrigeration.

The cooled second cycle water at a temperature of 12° C. is withdrawn from the upper section of column 2 via conduit 17, and, for the most part, is recycled by way of the heat exchanger 14 where it is heated to 26° C. and then passed to the upper section via conduit 8. A very small portion of the physical solvent is withdrawn by the gas leaving the physical scrubbing step. This withdrawn solvent is scrubbed from the gas by the water in the upper section of column 2. To keep the concentration of the physical solvent in the second water cycle at a tolerable level, a small portion of the water, namely 5 t/h, is admixed via conduit 18 to the solvent in conduit 5.

Since the purified gas vaporizes water during the cooling of second cycle water, make-up fresh water (11 t/h) is introduced via conduit 19).

The preferred packing for the column consist of ceramic saddles.

In cases where requirements for the purity of the treated gas are not so severe, the water of the lower direct heat exchange may be pumped directly to the upper section of column 2, thus eliminating heat exchange 14 in part. To do so, the part of the cycle water in conduit 11 that shall be cooled further than it is possible in heat exchanger 14 using the external cooling water in conduit 15 is conveyed to the upper section of column 2 via conduit 8. After it has been cooled there it is returned via conduit 17 to heat exchanger 16.

It is well understood that the description of the invention as well as the given example enables those skilled in the art to adapt the characteristics of this invention to other problems where the main process step is e.g. executed at still lower temperatures or at elevated temperatures. Some catalytic process may serve as an example for the latter case. There the incoming gas has to be heated, preferable by heat exchange with the treated gas. The direct heat exchange process of this invention can be used for this application with advantage.

What is claimed is:

1. A process for subjecting a gas to heat exchange, said process comprising directly contacting said as continuously with a first heat transfer liquid in a first direct contact heat exchange zone, thereby resulting in a change of enthalpy in both said gas and said first heat transfer liquid and in a change of the temperature of the gas to a desired temperature level;

passing resultant gas at the desired temperature level to a processing step wherein said resultant gas is contacted with a solvent to desulfurize said resultant gas; and passing resultant processed gas to a second direct contact heat exchange zone and directly contacting said processed gas therein continuously with a second heat transfer liquid, the latter having an enthalpy level at least partially transferred thereto from the enthalpy change of the gas in the first direct contact heat exchange zone, said second heat transfer liquid being in a separate cycle from said first heat transfer liquid, and wherein the transfer of said enthalpy change is performed by indirect heat exchange between said first heat transfer liquid and said second heat transfer liquid.

2. A process according to claim 1, wherein the first heat transfer liquid is heated in the first heat exchange zone and the second heat transfer liquid is cooled in the second heat exchange zone.

3. A process according to claim 2, wherein the first and second direct heat exchange zones are superimposed inside a column and the direct heat exchange contact in both zones between gas and liquid is conducted countercurrently.

4. A process according to claim 3, wherein said processing step is conducted in the column in between the two direct heat exchange zones.

5. A process according to claim 4, wherein the first and second heat transfer liquids are water.

6. A process according to claim 3, wherein the first and second heat transfer liquids are water.

7. A process according to claim 2, wherein the first and second heat transfer liquids are water.

8. A process according to claim 1, wherein the first and second direct heat exchange zones are superimposed inside a column and the direct heat exchange contact in both zones between gas and liquid is conducted countercurrently.

9. A process according to claim 1, wherein the first and second heat transfer liquids are each water or a liquid hydrocarbon.

10. A process according to claim 1, wherein the first and second heat transfer liquids are water.

11. A process according to claim 1, wherein the gas entering the first direct contact heat exchange zone is flue gas containing $SO_2$.

12. A process according to claim 11, wherein said processing step comprises absorbing $SO_2$ from the gas with a solvent.

13. A process according to claim 12, wherein said first heat exchange, the processing step, and said second het exchange are all conducted in a single column.

14. A process according to claim 12, wherein loaded solvent is removed from the processing step, regenerated and then recycled to the processing step.

15. A process according to claim 1, wherein the first heat transfer liquid is cooled in the first heat exchange zone and the second heat transfer liquid is heated in the second heat exchange zone.

16. A process according to claim 1, wherein said gas treated in a processing step is either discharged or further processed at a temperature close to its initial temperature.

17. A process according to claim 1, wherein the direct contact heat exchange of gas with heat transfer liquid is conducted in a packed column.

18. A process according to claim 1, wherein said processing step comprises a scrubbing step.

19. A process according to claim 1, wherein said desulphurization is conducted between about 20°–60° C.

20. A process according to claim 1, wherein the contacting of said gas with said first heat transfer liquid in a first direct contact heat exchange zone occurs in two steps.

21. A process according to claim 20 wherein a second partial stream of the first heat transfer liquid, formed in said second step in the first direct contact heat exchange zone, passes through a cooler and is cooled to a desired temperature by external refrigeration.

22. A process according to claim 1, wherein the flue gas is subjected to a preliminary water-scrubbing step prior to introduction into said first heat exchange zone.

23. A process according to claim 1, wherein said gas is a flue gas and the entire flue gas is subjected to absorption in said processing step.

* * * * *